US012646405B2

(12) United States Patent
Gee et al.

(10) Patent No.: US 12,646,405 B2
(45) Date of Patent: Jun. 2, 2026

(54) SYSTEMS AND METHODS FOR FINE-GRAINED TRAFFIC NOISE PREDICTION

(71) Applicant: Brigham Young University, Provo, UT (US)

(72) Inventors: Kent L. Gee, Provo, UT (US); Mylan Ray Cook, Springville, UT (US); Mark K. Transtrum, Springville, UT (US)

(73) Assignee: Brigham Young University, Provo, UT (US)

( * ) Notice: Subject to any disclaimer, the term of this patent is extended or adjusted under 35 U.S.C. 154(b) by 118 days.

(21) Appl. No.: 18/807,755

(22) Filed: Aug. 16, 2024

(65) Prior Publication Data

US 2026/0073788 A1 Mar. 12, 2026

Related U.S. Application Data

(60) Provisional application No. 63/533,528, filed on Aug. 18, 2023.

(51) Int. Cl.
*G08G 1/01* (2006.01)
*G08G 1/065* (2006.01)

(52) U.S. Cl.
CPC ............ *G08G 1/01* (2013.01); *G08G 1/0133* (2013.01); *G08G 1/065* (2013.01)

(58) Field of Classification Search
CPC .......... G08G 1/00; G08G 1/01; G08G 1/0116; G08G 1/012; G08G 1/0145; G08G 1/052; G08G 1/0967; G08G 1/205; G05D 1/00; G05D 1/02
See application file for complete search history.

(56) References Cited

U.S. PATENT DOCUMENTS

| | | | | |
|---|---|---|---|---|
| 2012/0065834 | A1* | 3/2012 | Senart | G08G 1/0962 701/31.4 |
| 2019/0228593 | A1* | 7/2019 | Liu | G08G 1/096872 |
| 2019/0318620 | A1* | 10/2019 | Yang | G08G 1/0133 |
| 2023/0368657 | A1* | 11/2023 | Shao | G16Y 10/40 |

* cited by examiner

*Primary Examiner* — Van T Trieu
(74) *Attorney, Agent, or Firm* — Lowenstein Sandler LLP

(57) ABSTRACT

A method for fine-grained traffic noise prediction includes obtaining location data indicating one or more locations and, for each respective location of the one or more locations, location-specific traffic data. The method includes, for each respective location of the one or more locations, using various computational models to predict a vehicle count and a vehicle class mix for the respective location; calculating, based on the predicted vehicle count and the predicted vehicle class mix, a number of vehicles per vehicle class for the respective location; and calculating, based on the number of vehicles per vehicle class, a predicted noise level for the respective location. The method includes causing a client device to display a map. The map may include, for each location of the one or more locations, a visual indication of the predicted noise level for the respective location.

20 Claims, 8 Drawing Sheets

200

400

SYSTEMS AND METHODS FOR FINE-GRAINED TRAFFIC NOISE PREDICTION

RELATED APPLICATIONS

This application claims, under 35 U.C.S.C. § 119 (e), priority to U.S. Provisional Patent Application No. 63/533, 528, filed Aug. 18, 2023, entitled "VROOM app: Nationwide traffic noise prediction," and which is incorporated by reference in its entirety.

STATEMENT REGARDING FEDERALLY SPONSORED RESEARCH

This invention was made with government support under Army Contract No. W911W6-18-C-0028 awarded by the U.S. Army Small Business Innovation Research (SBIR) to Blue Ridge Research and Consulting, LLC. The government has certain rights in the invention.

TECHNICAL FIELD

The present disclosure generally relates to computing devices. More specifically, the present disclosure relates to systems and methods for fine-grained traffic noise prediction.

BACKGROUND

Traffic noise prediction involves estimating sound levels generated by road traffic. These predictions are used for urban planning, environmental impact assessments, and infrastructure development. Understanding noise levels helps make informed decisions about road designs, noise barriers, and land use to mitigate the adverse effects of noise traffic.

SUMMARY

One aspect of the present disclosure includes a method for fine-grained traffic noise prediction. The method includes obtaining location data indicating one or more locations and, for each respective location of the one or more locations, location-specific traffic data. The method includes, for each respective location of the one or more locations: (1) predicting, using a vehicle count model and using the location-specific traffic data for the respective location as input to the vehicle count model, a vehicle count for the respective location; (2) predicting, using a vehicle class mix model and using the location-specific traffic data for the respective location as input to the vehicle class mix model, a vehicle class mix for the respective location; (3) calculating, based on the predicted vehicle count and the predicted vehicle class mix, a number of vehicles per vehicle class for the respective location; and (4) calculating, based on the number of vehicles per vehicle class, a predicted noise level for the respective location. The method includes causing a client device to display a map. The map may include, for each location of the one or more locations, a visual indication of the predicted noise level for the respective location.

Another aspect of the present disclosure includes a system for fine-grained traffic noise prediction. The system includes a memory and a processing device coupled to the memory. The processing device is configured to perform operations. The operations include obtaining location data indicating one or more locations and, for each respective location of the one or more locations, location-specific traffic data. The operations include, for each respective location of the one or more locations: (1) predicting, using a vehicle count model and using the location-specific traffic data for the respective location as input to the vehicle count model, a vehicle count for the respective location; (2) predicting, using a vehicle class mix model and using the location-specific traffic data for the respective location as input to the vehicle class mix model, a vehicle class mix for the respective location; (3) calculating, based on the predicted vehicle count and the predicted vehicle class mix, a number of vehicles per vehicle class for the respective location; and (4) calculating, based on the number of vehicles per vehicle class, a predicted noise level for the respective location. The operations include causing a client device to display a map. The map may include, for each location of the one or more locations, a visual indication of the predicted noise level for the respective location.

Another aspect of the present disclosure includes a non-transitory computer-readable storage medium with instructions that, when executed by a processing device, cause the processing device to perform operations. The operations include obtaining location data indicating one or more locations and, for each respective location of the one or more locations, location-specific traffic data. The operations include, for each respective location of the one or more locations: (1) predicting, using a vehicle count model and using the location-specific traffic data for the respective location as input to the vehicle count model, a vehicle count for the respective location; (2) predicting, using a vehicle class mix model and using the location-specific traffic data for the respective location as input to the vehicle class mix model, a vehicle class mix for the respective location; (3) calculating, based on the predicted vehicle count and the predicted vehicle class mix, a number of vehicles per vehicle class for the respective location; and (4) calculating, based on the number of vehicles per vehicle class, a predicted noise level for the respective location. The operations include causing a client device to display a map. The map may include, for each location of the one or more locations, a visual indication of the predicted noise level for the respective location.

BRIEF DESCRIPTION OF THE DRA WINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1A schematically illustrates an example system for fine-grained traffic noise prediction, in accordance with some implementations of the present disclosure.

FIG. 1B schematically illustrates another example system for fine-grained traffic noise prediction, in accordance with some implementations of the present disclosure.

FIG. 2 depicts a flowchart illustrating an example method for practicing selected aspects of the present disclosure, in accordance with various embodiments.

FIG. 3 schematically illustrates an example data flow for fine-grained traffic noise prediction, in accordance with some implementations of the present disclosure.

FIG. 4 schematically illustrates an example data flow for fine-grained traffic noise prediction, in accordance with some implementations of the present disclosure.

FIG. 5 schematically illustrates an example data flow for fine-grained traffic noise prediction, in accordance with some implementations of the present disclosure.

DETAILED DESCRIPTION

Traffic noise prediction involves estimating sound levels generated by road traffic and is used for urban planning and other development to help make informed decisions about road designs, noise barriers, and land use to mitigate the adverse effects of traffic noise. Conventional computational models that predict traffic noise for a small area cannot be directly applied to larger areas because doing so would be too computationally intensive and because the number of vehicles in a particular location are not expected to be identical to the number of vehicles in other locations. Other conventional models can predict traffic noise for larger areas, but the traffic noise is often an annual average traffic noise level that does not take into account variations in traffic during different periods of time. For example, there is a significantly larger number of vehicles on the road during evening rush hour on a weekday than during early morning on a Sunday, but computational models that generate an annual average traffic noise level do not take this variation or other variations into account.

Aspects and implementations of the present disclosure address the above deficiencies, among others, by providing systems and methods that use computational models to predict traffic noise, and the computational models and the data they use to predict traffic noise are small enough to be executed on computing devices used by mass market consumers (e.g., mobile devices or laptop computers). Furthermore, the computational models are configured to predict fine-grained traffic noise (e.g., for a specific hour or other time period) for larger areas, such as a nationwide scale.

In addition, some benefits of the present disclosure may provide a technical effect caused by or resulting from a technical solution to a technical problem. For example, one technical problem may relate to conventional traffic noise computational models consuming too many computing resources when predicting traffic noise for a large area. One of the technical solutions to this technical problem may include using the traffic noise computational models of the present disclosure, which use a much smaller amount of processing power, memory usage, and data storage. As a consequence, computing resource usage is reduced, and computing resource usage is more efficient. Another technical problem may relate to conventional traffic noise computational models producing traffic noise level results that are averaged over an entire year. One of the technical solutions to this other technical problem includes using the traffic noise computational models of the present disclosure, which produce traffic noise level results that are specific to a much smaller amount of time (e.g., a specific hour). As a consequence, the results of the traffic noise computational models of the present disclosure are more accurate in terms of being applicable to a time and location, and are thus more relevant.

Figure 1A:
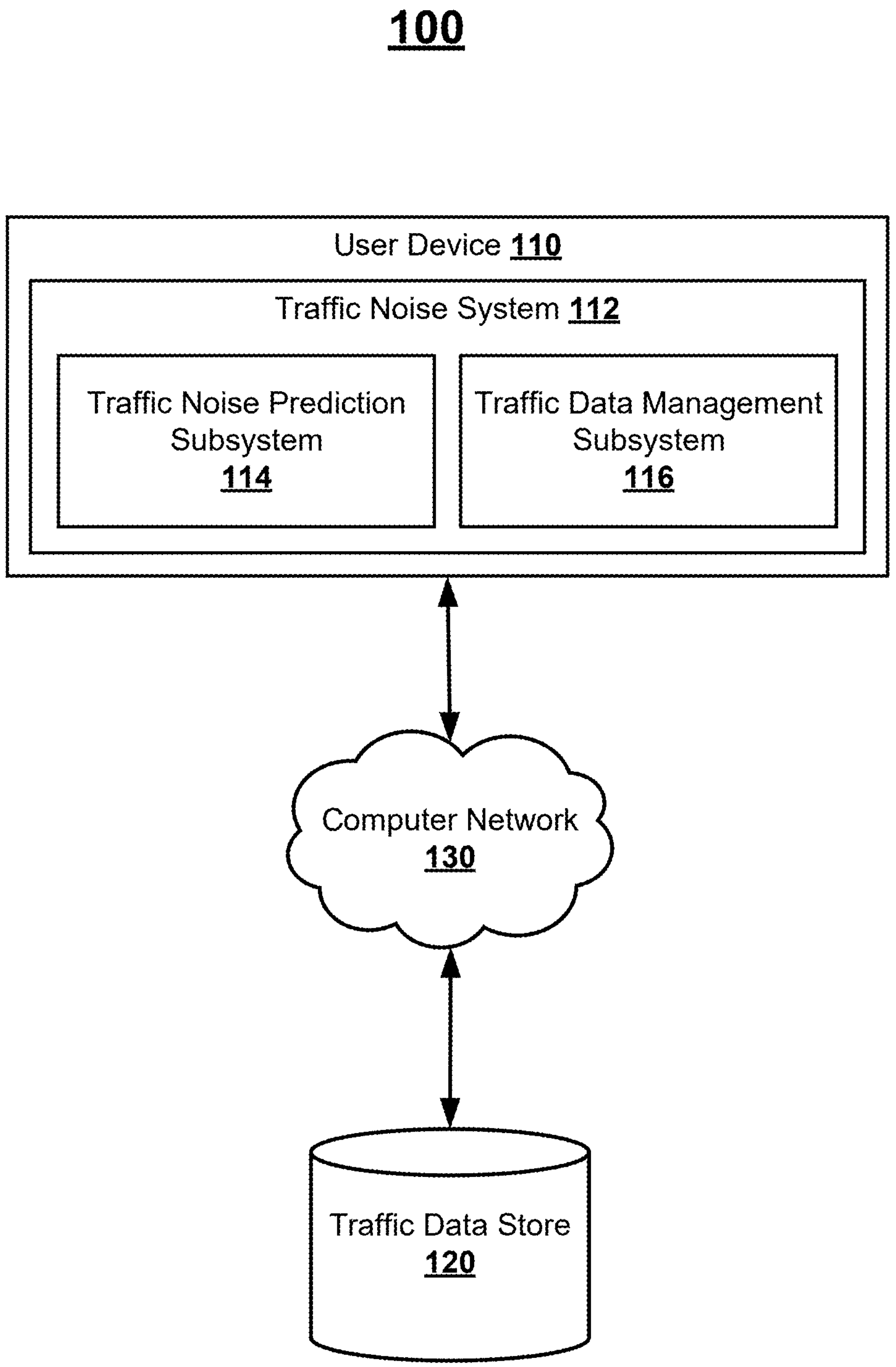

FIG. 1A schematically illustrates an example system 100 for fine-grained traffic noise prediction, in accordance with some implementations of the present disclosure. The system 100 includes a user device 110. The user device 110 may include a traffic noise system 112. The traffic noise system 112 may include a traffic noise prediction subsystem 114 and a traffic data management subsystem 116. The system 100 may include a traffic data store 120, which may include a data store that stores traffic data for one or more locations. The system 100 may include a computer network 130. The computer network 130 may enable data communication between the user device 110, the traffic data store, or one or more other computing devices. As discussed in detail below, in some implementations, the traffic noise prediction subsystem 114 may obtain traffic data for one or more locations, use the traffic data as input to various computational models to predict a traffic noise level for the one or more locations, and may display a visual representation of the traffic noise level for the one or more locations on a user interface (UI) of the user device 110 so a user of the user device 110 can make informed decisions about road designs, noise barriers, and land use to mitigate the adverse effects of traffic noise.

In one implementation, the user device 110 may include a computing device. In some implementations, a computing device may include a physical computing device. A physical computing device may include a desktop computer, a laptop computer, a mobile device (e.g., a smartphone, a tablet computer, or the like), or some other type of computing device. A computing device may include a virtualized component, such as a virtual machine (VM) or a container. A computing device may include an instance of a computing device. An instance of a computing device may include a spun-up instance that may not be specific to any computing device. In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing in the cloud computing environment.

In some implementations, the traffic noise system 112 may include hardware, software, or a combination of hardware or software. The traffic noise system 112 may include a software application executing on the user device 110. The traffic noise system 112 may be configured to predict traffic noise for one or more locations. A user of the user device 110 may provide user input to indicate the one or more locations. The traffic noise system 112 may provide resulting traffic noise data to a UI for display on the user device 110.

In one or more implementations, the traffic noise prediction subsystem 114 may include a portion of the traffic noise system 112 configured to predict traffic noise levels for one or more locations. The traffic noise prediction subsystem 114 may include one or more computational models used to predict the traffic noise levels. Further details regarding the traffic noise prediction subsystem 114 are provided below in relation to FIG. 2.

In one implementation, the traffic data management subsystem 116 may include a portion of the traffic noise system 112 configured to obtain traffic data from the traffic data store 120. The traffic data management subsystem 116 may store the obtained traffic data. The traffic data management subsystem 116 may provide portions of the traffic data to the traffic noise prediction subsystem 114 for use in predicting traffic noise levels. The traffic data management subsystem 116 may coordinate with the traffic data store 120 to keep the traffic data stored by the traffic data management subsystem 116 up to date.

In some implementations, the traffic data store 120 may include a data store configured to store traffic data for one or more locations. The traffic data store 120 may obtain traffic data from a variety of sources, including one or more traffic monitoring stations located at various locations. The traffic data store 120 may be owned, operated, or controlled by a different entity than the entity that owns, operates, or controls the user device 110.

In some implementations, the computer network 130 may include a local area network (LAN), wide area network (WAN), an internet service provider (ISP), the Internet, or some other network. The computer network 130 may include one or more routers, switches, hubs, or other networking devices. The computer network 130 may enable data communication between the user device 110, the traffic data store 120, or one or more other computing devices.

Figure 1B:
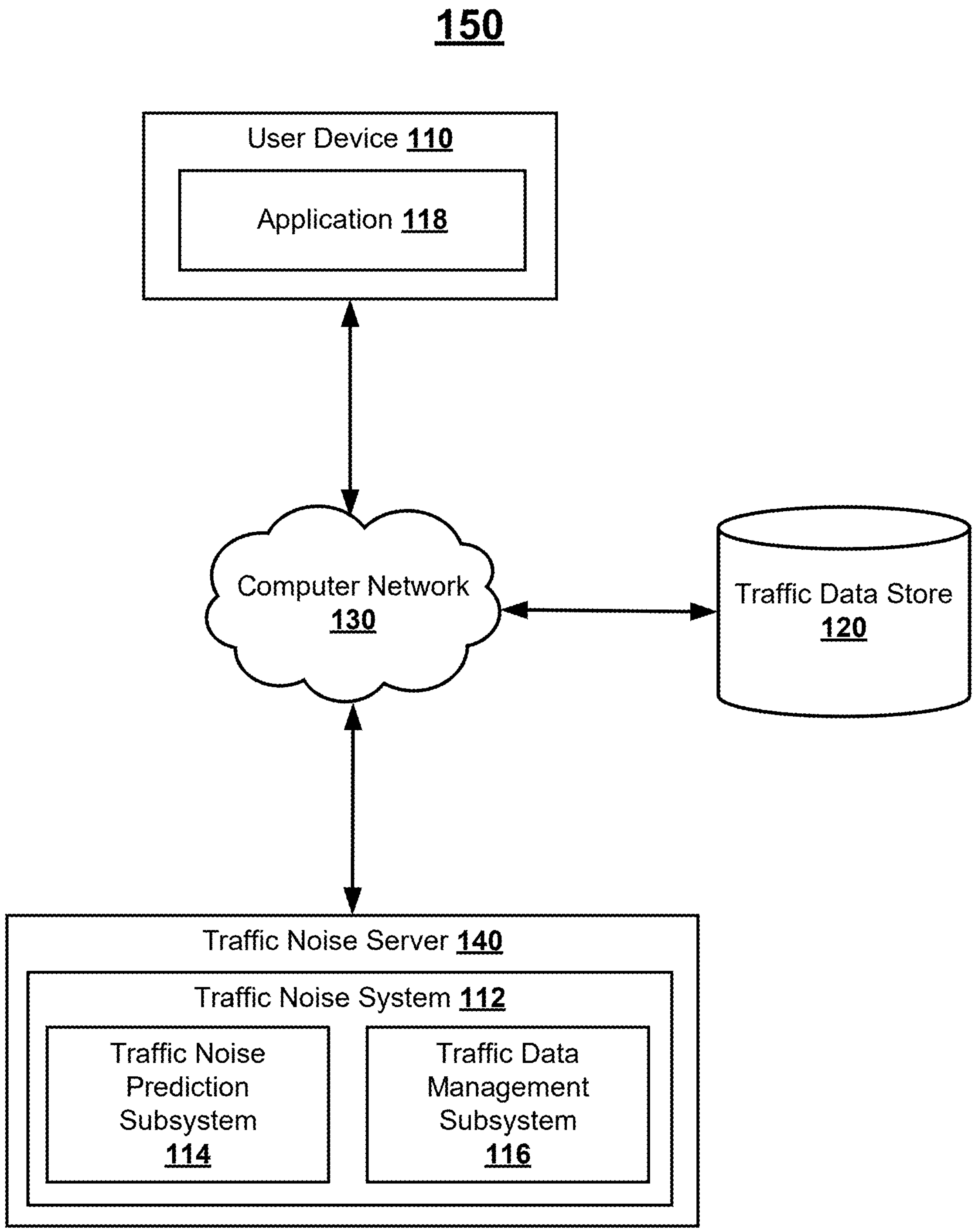

FIG. 1B schematically illustrates another example system 150 for fine-grained traffic noise prediction, in accordance with some implementations of the present disclosure. The system 150 may include one or more components of the system 100 of FIG. 1A. For example, the system 150 may include the user device 110, the traffic noise prediction subsystem 114, the traffic data management subsystem 116, the traffic data store 120, or the computer network 130. In some implementations, the user device 110 may include an application. The system 150 may include a traffic noise server 140 that includes the traffic noise system 112.

In one implementation, the user device 110 may not include the traffic noise system 112. Instead, the user device 110 may include an application 118. The application 118 May include a software application. The application 118 may include a client application that interacts with the traffic noise server 140 in a client-server architecture.

The traffic noise server 140 may include a computing device, such as an application server. In some implementations, the traffic noise server 140 may include a cloud computing system. A cloud computing system may include one or more computing devices (or portions of cloud computing devices) provided to an end user by a cloud provider. An end user of the environment may utilize a portion of the cloud computing system to host content for use or access by other parties or perform other computational tasks. In some implementations, the cloud computing system may be configured to allow the end user to use a portion of a computing device (e.g., only certain hardware, software, or other computer system resources). The cloud computing environment may include a private cloud, a public cloud, or a hybrid cloud. The cloud computing environment may provide infrastructure-as-a-service (IaaS), platform-as-a-service (PaaS), or software-as-a-service (SaaS) computing. The cloud computing environment may provide serverless computing.

The traffic noise server 140 may host the traffic noise system 112, provide input to the traffic noise system 112, and obtain output from the traffic noise system 112. The traffic noise server 140 may receive the input from the application 118 and may provide the output to the application 118. For example, a user of the user device 110 may provide user input to the application 118, the application may provide data based on the user input to the traffic noise server 140, the traffic noise server may provide the data to the traffic noise system 112, and the traffic noise system 112 may use the data and traffic data from the traffic data management subsystem 116 as input to the traffic noise prediction subsystem 114. The traffic noise prediction subsystem 114 may generate traffic noise level data as output, which the traffic noise system 112 may provide to the application 118, and the application 118 may display an output based on the received traffic noise level data on a UI of the user device 110.

Figure 2:
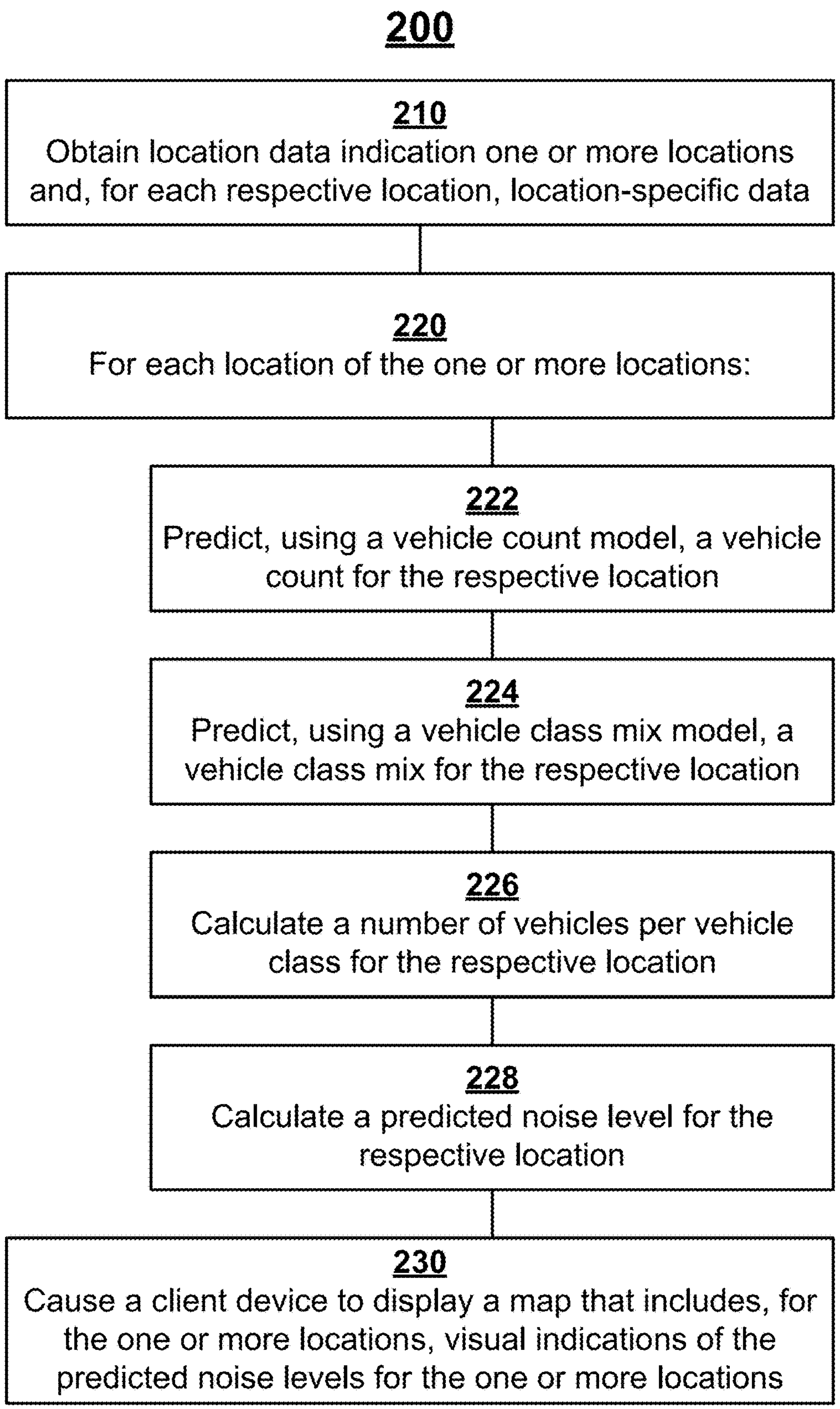

FIG. 2 is a flowchart illustrating one embodiment of a method 200 for fine-grained traffic noise prediction, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 200 and/or one or more individual functions, routines, subroutines, or operations of the method 200. In certain implementations, a single processing thread can perform the method 200. Alternatively, two or more processing threads can perform the method 200, each thread executing one or more individual functions, routines, subroutines, or operations of the method. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional. In some implementations, the traffic noise prediction subsystem 114 performs one or more operations of the method 200.

At block 210, processing logic may obtain location data indicating one or more locations. For each respective location of the one or more locations, processing logic may obtain location-specific traffic data.

In one implementation, the traffic noise prediction subsystem 114 may obtain the location data from user input to the user device 110. For example, the user device 110 May display a UI for the traffic noise system 112 or the application 118. The UI may include a component for the user to select or input one or more locations. Responsive to the user selecting or inputting the one or more locations, the UI may provide data indicating the one or more locations to the traffic noise system 112 or the application 118. The traffic noise system 112 may provide the one or more locations to the traffic noise prediction subsystem 114, or the application 118 may provide the one or more locations to the traffic noise server 140, which may provide the one or more locations to the traffic noise system 112 to provide to the traffic noise prediction subsystem 114.

The traffic noise prediction subsystem 114 may use the one or more locations to obtain the location-specific traffic data for each location of the one or more locations. For example, the traffic noise prediction subsystem 114 may send a request to the traffic data management subsystem 116, and the request may include the one or more locations. The traffic data management subsystem 116 may use the one or more locations to retrieve the location-specific traffic data for the one or more locations and provide the location-specific traffic data to the traffic noise prediction subsystem 114 as a response to the request.

In one implementation, the location-specific traffic data for a respective location may include data indicating one or more traffic or road features for the respective location. The location-specific traffic data may include data indicating whether the respective location is urban, rural, suburban, or some other geographic classification. The location-specific traffic data may include data indicating a road classification of the respective location. The road classification may include interstate, other freeway, principal arterial, or another road classification. The location-specific traffic data may include data indicating a pavement type of the respective location. The pavement type may include concrete (which may include Portland cement concrete), dense-graded asphaltic concrete (DGAC), open-grade asphaltic concrete (OGAC), a mixture of DGAC and Portland cement concrete, gravel, or some other pavement type. The location-specific traffic data may include data indicating a number of through lanes at the respective location. The location-specific traffic data may include data indicating a speed limit for the respective location. The location-specific traffic data may include data indicating an annual average daily traffic (AADT) amount of the respective location.

In some implementations, the location-specific traffic data may include data indicating one or more geospatial features of the respective location. The geospatial features may include the brightness of nighttime lights, population density, land use data, land cover data, or other geospatial features. The location-specific traffic data may indicate other features (road, traffic, geospatial, or otherwise) of the respective location.

At block 220, for each respective location of the one or more locations, processing logic may perform one or more operations 222-228. At block 222, processing logic may predict, using a vehicle count model and using the location-specific data for the respective location as input to the vehicle count model, a vehicle count for the respective location. The vehicle count model may include a computational model. In one implementation, the computational model may include a regression model.

Figure 3:
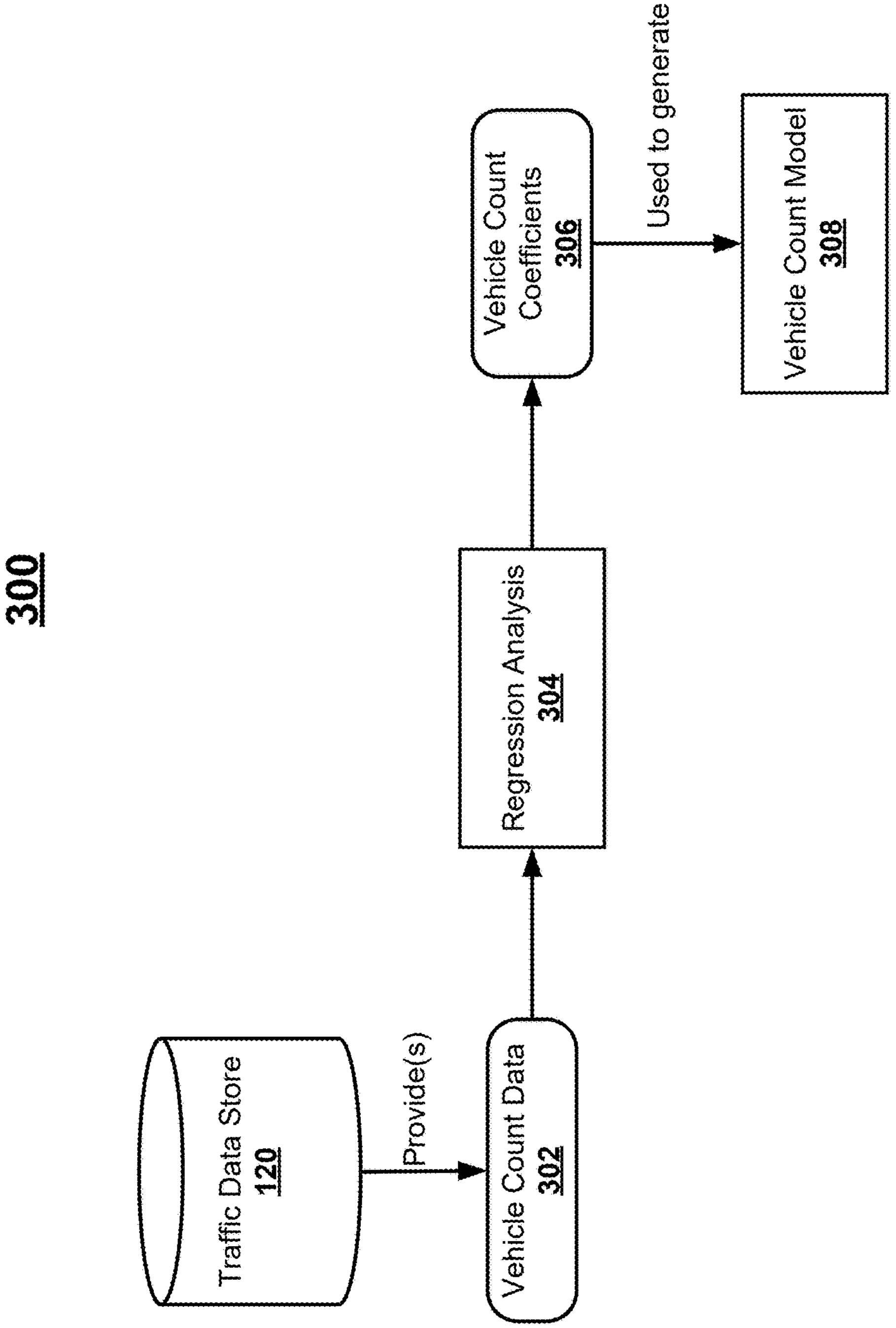

With additional reference to the method 200 of FIG. 2, FIG. 3 schematically illustrates an example data flow 300 for fine-grained traffic noise prediction, in accordance with some implementations of the present disclosure. The data flow 300 may include a data flow for generating a regression model for use as the vehicle count model of block 222. In one implementation, the traffic data store 120 may provide respective vehicle count data 302. The traffic data store 120 may obtain traffic data on which the vehicle count data 302 is based from one or more traffic monitoring stations. A traffic monitoring station may include a system that senses data about vehicles that pass through a specific area. The traffic monitoring station may include one or more sensors that sense the presence and features of a vehicle (e.g., inductive loops, radar, lidar, cameras, etc.) and records such features.

In some implementations, the vehicle count data 302 may include a number of vehicles sensed by a respective traffic monitoring station. The vehicle count data 302 may include data that associates portions of the number of vehicles to a predetermined amount of time (e.g., an hour, a day, a week, etc.) or to a specific time period (e.g., a specific hour, day, week, etc.).

A computing device generating the vehicle count model (e.g., the traffic noise server 140 or another computing device) may obtain the vehicle count data 302. The computing device may perform a regression analysis 304 on the vehicle count data 302 to generate one or more vehicle count coefficients 306. The regression analysis 304 may include a Fourier analysis or some other type of regression analysis capable of producing coefficients. The computing device can then use the one or more vehicle count coefficients 306 to generate the vehicle count model 308. The vehicle count model 308 can predict vehicle count data for a location that does not have associated vehicle count data 302 (e.g., a location that is not monitored by a traffic monitoring station). The vehicle count model 308 may use location-specific data as input and may predict the vehicle count data based on the input. Responsive to generating the vehicle count model 308, the computing device may provide the vehicle count model 308 to the traffic noise prediction subsystem 114 for use.

In one implementation, the computational model of the vehicle count model 308 may include or be an artificial intelligence (AI) model. An AI model may include a machine learning model (MLM). An MLM can include a computer program that has been trained on a set of data to perform a specific task. It should be understood that an MLM can refer to a variety of different types of MLMs. For example, an MLM can include an artificial neural network (ANN), which can include multiple nodes ("neurons") arranged in one or more layers, and a neuron may be connected to one or more neurons via one or more edges ("synapses"). The synapses may perpetuate a signal from one neuron to another, and a weight, bias, or other configuration of a neuron or synapse may adjust a value of the signal. The ANN can undergo training to adjust the weights or adjust other features of the ANN. Such training may include inputting a training set and other information into the ANN and adjusting the ANN's features in response to an output of the ANN. An ANN may include a deep learning ANN, which may include an ANN with a large number of neurons, synapses, or layers. An MLM may include another type of MLM, such as clustering, decision trees, Bayesian networks, or the like.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that can be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one implementation, a training subsystem of the computing device manages the training and testing of the one or more AI models. A training data engine can generate training data (e.g., a set of training inputs and a set of target outputs) to train an AI model. In an illustrative example, the training data engine can initialize a training set T to null. The training data engine can add training data to the training set T and can determine whether training set Tis sufficient for training the AI model. The training set T can be sufficient for training the AI model if the training set T includes a threshold amount of training data, in some implementations. In response to determining that the training set T is not sufficient for training, the training data engine can identify additional training data and add the additional training data to the training set T. In response to determining that the training set T is sufficient for training, the training data engine can provide the training set T to a training engine.

In one implementation, a piece of training data used to train the vehicle count model 308 may include one or more location-specific features, discussed above. The piece of training data may include a target output that includes a corresponding vehicle count.

The training engine can train the AI model using the training data (e.g., training set T). The AI model can refer to the model artifact that is created by the training engine using the training data, where such training data can include training inputs and, in some implementations, corresponding target outputs (e.g., correct answers for respective training inputs). The training engine can input the training data into the AI model so that the AI model can find patterns in the training data and configure itself based on those patterns.

Where the AI model uses supervised learning, the training engine can assist the AI model in determining whether the AI model maps the training input to the target output (the answer to be predicted). Where the AI model uses unsupervised learning, the training engine can input the training data into the AI model. The AI model can configure itself based on the input training data, but since the training data may not include a target output, the training engine may not assist the AI model in determining whether the AI model provided a correct output during the training process.

A validation engine may be capable of validating a trained AI model using a corresponding set of features of a validation set from the training data engine. The validation engine can determine an accuracy of each of the trained AI models based on the corresponding sets of features of the validation set. Where the training data may not include a target output, validating a trained AI model may include obtaining an output from the AI model and providing the output to another entity for evaluation. The other entity may include another AI model configured to evaluation the output of the AI model that is undergoing training. The other entity may include a human. The validation engine can discard a trained AI model that has an accuracy that does not meet a threshold accuracy or that otherwise fails evaluation. In some implementations, a selection engine is capable of selecting a trained AI model that has an accuracy that meets a threshold accuracy. In some implementations, the selection engine is capable of selecting the trained AI model that has the highest accuracy of multiple trained AI models. In some implementations, the selection engine obtains input from another AI model or a human and can select a trained AI model based on the input.

A testing engine may be capable of testing a trained AI model using a corresponding set of features of a testing set from the training data engine. For example, a first trained AI model that was trained using a first set of features of the training set may be tested using the first set of features of the testing set. The testing engine can determine a trained AI model that has the highest accuracy or other evaluation of all of the trained AI models based on the testing sets.

In some implementations, responsive to the AI training subsystem completing the training, validation, or testing of the vehicle count model 308, the AI training subsystem may provide the vehicle count model 308 to the traffic noise prediction subsystem 114 for use.

In one or more implementations, the predicted vehicle count for the respective location may include a periodic vehicle count over a period of time. For example, the vehicle count may include an hourly vehicle count over one week, a daily vehicle count over one week, a weekly vehicle count over a month, a weekly vehicle count over a year, or some other period vehicle count over a period of time.

Returning to the discussion of the method 200 of FIG. 2, at block 224, processing logic may predict a vehicle class mix for the respective location. Processing logic may use a vehicle class mix model to predict the vehicle class mix and may use the location-specific traffic data for the respective location as input to the vehicle class mix model. The vehicle class mix model may include a computational model. The computational model may include a regression model or may include an AI model.

Figure 4:
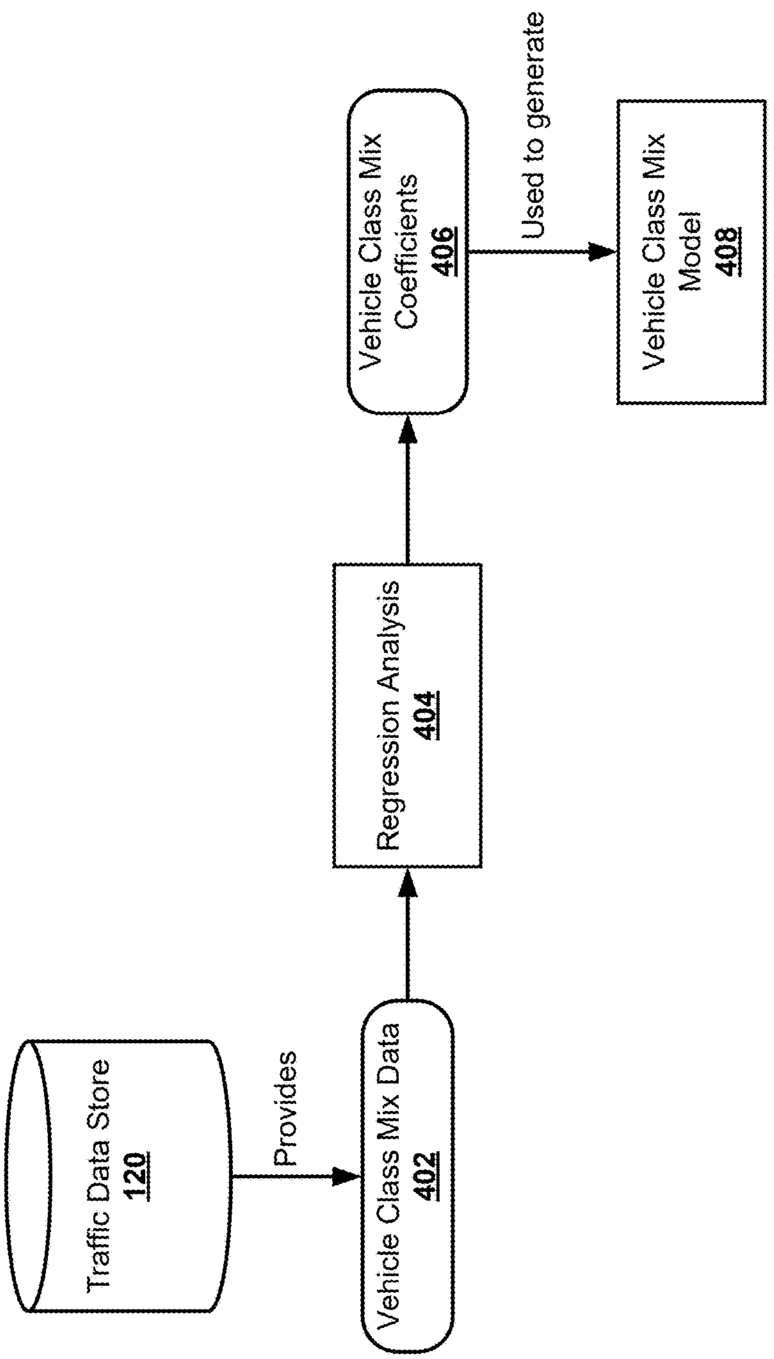

With additional reference to the method 200 of FIG. 2, FIG. 4 schematically illustrates an example data flow 400 for fine-grained traffic noise prediction, in accordance with some implementations of the present disclosure. The data flow 400 may include a data flow for generating a regression model for use as the vehicle class mix model of block 224. In one implementation, the traffic data store 120 may provide respective vehicle class mix data 402. The traffic data store 120 may obtain traffic data on which the vehicle class mix data 402 is based from a traffic monitoring station. A traffic monitoring station may include a system that senses a class of vehicle to which a sensed vehicle belongs. A vehicle class may include a combination truck (sometimes referred to as a tractor-trailer, a semi-trailer truck, or a semi-truck), a single-unit truck (e.g., a delivery truck, a haul vehicle, a camping or recreational vehicle, or a motor home), a passenger vehicle, a bus, a motorcycle, or another class of vehicle. In some implementations, the traffic data store 120 may obtain traffic data on which the vehicle class mix data 402 is based from other sources (e.g., one or more traffic class mix reports for one or more locations, user input, etc.).

In some implementations, the vehicle class mix data 402 may include data indicating the proportion of each vehicle class sensed by a respective traffic monitoring station. For example, the vehicle class mix data 402 may include, for each vehicle class, a real number between 0 and 1 that is proportional to occurrence of that respective vehicle class at the traffic monitoring station. In another example, the vehicle class mix data 402 may include, for each vehicle class, angular coordinates between 0 and $\pi/2$. The vehicle class mix data 402 may include data associating the vehicle class mix to a predetermined amount of time (e.g., an hour, a day, a week, etc.) or to a specific time period (e.g., a specific hour, day, week, etc.). The vehicle class mix data 402 may include data indicating temporal changes in vehicle class mix. For example, the vehicle class mix data 402 may include data indicating observed yearly traffic characteristics of different vehicle classes reported on a month-by-month basis for urban and rural locations. The vehicle class mix data 402 may include data indicating observed weekly traffic characteristics of different vehicle classes reported on a day-of-the-week basis and an hour-of-the-day basis for urban and rural locations.

A computing device generating the vehicle class mix model may obtain the vehicle class mix data 402. The computing device may perform a regression analysis 404 on the vehicle class mix data 402 to generate one or more vehicle class mix coefficients 406. The regression analysis 404 may include a Fourier analysis or some other type of regression analysis capable of producing coefficients. The computing device can then use the one or more vehicle class mix coefficients 406 to generate the vehicle class mix model 408. The vehicle class mix model 408 can predict vehicle class mix data for a location that does not have associated vehicle class mix data 402 (e.g., a location that is not monitored by a traffic monitoring station). The vehicle class mix model 408 may use location-specific data as input and may predict the vehicle class mix data based on the input. Responsive to generating the vehicle class mix model 408, the computing device may provide the vehicle class mix model 408 to the traffic noise prediction subsystem 114 for use.

In one implementation, the one or more vehicle class mix coefficients 406 may include, for each vehicle class of the vehicle class mix data 402, one or more vehicle class mix coefficients representing a relative amount of vehicles of the respective vehicle class over a first time period and one or more vehicle class mix coefficients representing the relative amount of vehicles of the respective vehicle class over a second time period. The first time period may be longer than the second time period. For example, the first time period may be a year, and the second time period may be a week.

In one example, the vehicle class mix coefficients 406 may include three coefficients that represent the relative amount of combination trucks across a year, three coefficients that represent single-unit trucks, and three coefficients that represent other vehicle classes). The regression analysis 404 may include generating these vehicle class mix coefficients 406 using a least-squares fitting method that yields coefficients that create the yearly traffic flow pattern that most closely matches the step-wise reported yearly traffic variation of each vehicle class. Similarly, the vehicle class mix coefficients 406 may include five coefficients that represent the weekly variability for combination trucks, five coefficients that represent the weekly variability of single-unit trucks, and five coefficients that represent the weekly variability of other vehicle classes. The above is one example implementation, and in other examples, the vehicle class mix coefficients 406 may include a different number of coefficients for different vehicle classes and for different time periods.

In one implementation, the computational model of the vehicle class mix model 408 may include an AI model. The AI model may include an AI model similar to the AI model of the vehicle count model 308. The AI model of the vehicle class mix model 408 may undergo a similar training process to the training process described above in relation to the vehicle count model 308. In one implementation, a piece of training data used to train the vehicle class mix model 408 may include one or more location-specific features, discussed above. The piece of training data may include a target output that includes a corresponding vehicle class mix.

In one or more implementations, the predicted vehicle class mix for the respective location may include a periodic vehicle class mix over a period of time. For example, the vehicle class mix may include an hourly vehicle class mix over one week, a daily vehicle class mix over one week, a weekly vehicle class mix over a month, a weekly vehicle class mix over a year, or some other period vehicle class mix over a period of time.

Returning to the discussion of the method 200 of FIG. 2, at block 226, processing logic may calculate, based on the predicted vehicle count and the predicted vehicle class mix, a number of vehicles per vehicle class for the respective location. Calculating the number of vehicles per vehicle class includes multiplying the predicted vehicle count (predicted in block 222) by the predicted vehicle class mix for the respective vehicle class (predicted in block 224). As discussed above, the predicted vehicle count and the predicted vehicle class mix may pertain to a periodic interval over a period of time (e.g., an hourly predicted vehicle count or vehicle class mix over a week). The number of vehicles per vehicle class may pertain to the same periodic interval over the same period of time.

As an example, the predicted vehicle count may be 286 and the predicted vehicle class mix may include combination trucks: 0.25, single-unit trucks: 0.15, and passenger vehicles: 0.6. Multiplying the predicted vehicle count by the predicted class mix may result in the number of vehicles per class being combination trucks: 72, single-unit trucks 43, and passenger vehicles: 171.

At block 228, processing logic calculates, based on the number of vehicles per vehicle class, a predicted noise level for the respective location. Calculating the prediction noise level may further include selecting and using constants based on vehicle type and pavement type. In one implementation, calculating the predicted noise level may include using the following traffic noise equations.

$$\text{Predicted Noise Level} = \sum_{i=1}^{n} 10^{(L_i/10)} \times m_i$$

where i is an index over vehicle classes, n is the number of vehicle classes, mi is the number of vehicles in the vehicle class indicated by i (as indicated by the number of vehicles per vehicle class calculated in block 226), and where Li is the equation:

$$\begin{aligned} L_i = {} & 10 \times \log_{10}(E_A) + (D_1 + 0.6214 \times D_2 \times s) + \\ & (E_1 + 0.6214 \times E_2 \times s) \times [\log_{10} f] + (F_1 + 0.6214 \times F_2 \times s) \times [\log_{10} f]^2 + \\ & (G_1 + 0.6214 \times G_2 \times s) \times [\log_{10} f]^3 + (H_1 + 0.6214 \times H_2 \times s) \times [\log_{10} f]^4 + \\ & (I_1 + 0.6214 \times I_2 \times s) \times [\log_{10} f]^5 + (J_1 + 0.6214 \times J_2 \times s) \times [\log_{10} f]^6 \end{aligned}$$

where $D_1$, $D_2$, $E_1$, $E_2$, $F_1$, $F_2$, $G_1$, $G_2$, $H_1$, $H_2$, $I_1$, $I_2$, $J_1$, and $J_2$ are constants selected from Table 1, below, based on the location-specific data for the respective location, s is the speed limit of the respective location (in kilometers per hour), and EA is calculated according to the equation:

$$E_A = (0.6214 \times s)^{A/10} \times 10^{B/10} + 10^{C/10}$$

where s is the speed limit of the respective location, and A, B, and C are constants selected from Table 1, below, based on the location-specific data for the respective location.

TABLE 1

| Vehicle Type | | | | | Pavement Type | | | |
|---|---|---|---|---|---|---|---|---|
| Passenger | Single-unit Truck | Combination Truck | Bus | Motorcycle | Concrete DGAC Mix | DGAC | OGAC | Concrete |
| X | | | | | X | | | |
| X | | | | | | X | | |
| X | | | | | | | X | |
| X | | | | | | | | X |
| | X | | | | X | | | |
| | X | | | | | X | | |
| | X | | | | | | X | |
| | X | | | | | | | X |
| | | X | | | X | | | |
| | | X | | | | X | | |
| | | X | | | | | X | |
| | | X | | | | | | X |
| | | | X | | X | | | |
| | | | X | | | X | | |
| | | | X | | | | X | |
| | | | X | | | | | X |
| | | | | X | X | X | X | X |

TABLE 1

Constants

| A | B | C | $D_1$ | $D_2$ | $E_1$ | $E_2$ |
|---|---|---|---|---|---|---|
| 41.740807 | 1.148546 | 67.00 | −7516.580054 | −9.7623 | 16460.1 | 11.65932 |
| 41.740807 | 0.494698 | 67.00 | −7313.985627 | −19.697019 | 16009.5 | 34.363901 |
| 41.740807 | −1.065026 | 67.00 | −9549.987851 | −146.173482 | 21064 | 340.622686 |
| 41.740807 | 3.520004 | 67.00 | −2027.8376 | −70.674562 | 3728.329033 | 155.109567 |
| 33.918713 | 20.591046 | 74.00 | −8997.974274 | 96.301703 | 19015.4 | −196.241744 |
| 33.918713 | 19.903775 | 74.00 | −8997.974274 | 96.301703 | 19015.4 | −196.241744 |
| 33.918713 | 19.345214 | 74.00 | −8997.974274 | 96.301703 | 19015.4 | −196.241744 |
| 33.918713 | 22.141611 | 74.00 | −8997.974274 | 96.301703 | 19015.4 | −196.241744 |
| 35.879850 | 21.019665 | 80.00 | −6864.586846 | −94.379848 | 14368.7 | 226.701375 |
| 35.879850 | 20.358498 | 80.00 | −6864.586846 | −94.379848 | 14368.7 | 226.701375 |
| 35.879850 | 19.107151 | 80.00 | −6864.586846 | −94.379848 | 14368.7 | 226.701375 |
| 35.879850 | 21.822818 | 80.00 | −6864.586846 | −94.379848 | 14368.7 | 226.701375 |
| 23.479530 | 38.006238 | 74.00 | 4621.365424 | −123.140566 | −11601.5 | 284.796174 |
| 23.479530 | 37.318967 | 74.00 | 4621.365424 | −123.140566 | −11601.5 | 284.796174 |
| 23.479530 | 36.760406 | 74.00 | 4621.365424 | −123.140566 | −11601.5 | 284.796174 |
| 23.479530 | 39.556803 | 74.00 | 4621.365424 | −123.140566 | −11601.5 | 284.796174 |
| 41.022542 | 10.013879 | 67.00 | 7546.65902 | −8.870177 | −17396 | 7.899209 |

| $F_1$ | $F_2$ | $G_1$ | $G_2$ | $H_1$ | $H_2$ |
|---|---|---|---|---|---|
| −14823.9 | −1.233347 | 7009.474786 | −4.327918 | −1835.189815 | 2.579086 |
| −14414.4 | −22.462943 | 6814.317463 | 6.093141 | −1783.723974 | −0.252834 |
| −19060.8 | −324.802942 | 9032.990872 | 161.886578 | −2363.810485 | −44.454426 |
| −2768.001364 | −138.780925 | 1030.541403 | 64.525774 | −195.32456 | −16.430316 |
| −16587 | 162.56952 | 7627.874332 | −70.394575 | −1950.412341 | 16.876826 |
| −16587 | 162.56952 | 7627.874332 | −70.394575 | −1950.412341 | 16.876826 |
| −16587 | 162.56952 | 7627.874332 | −70.394575 | −1950.412341 | 16.876826 |
| −16587 | 162.56952 | 7627.874332 | −70.394575 | −1950.412341 | 16.876826 |
| −12459.2 | −220.015419 | 5710.525999 | 110.518825 | −1458.340416 | −30.365892 |
| −12459.2 | −220.015419 | 5710.525999 | 110.518825 | −1458.340416 | −30.365892 |
| −12459.2 | −220.015419 | 5710.525999 | 110.518825 | −1458.340416 | −30.365892 |
| −12459.2 | −220.015419 | 5710.525999 | 110.518825 | −1458.340416 | −30.365892 |
| 11535.3 | −267.623062 | −5896.461017 | 130.822488 | 1645.797051 | −35.139019 |
| 11535.3 | −267.623062 | −5896.461017 | 130.822488 | 1645.797051 | −35.139019 |
| 11535.3 | −267.623062 | −5896.461017 | 130.822488 | 1645.797051 | −35.139019 |
| 11535.3 | −267.623062 | −5896.461017 | 130.822488 | 1645.797051 | −35.139019 |
| 16181.8 | 2.526152 | −7828.632535 | −5.314462 | 2085.468458 | 2.344913 |

| $I_1$ | $I_2$ | $J_1$ | $J_2$ |
|---|---|---|---|
| 252.418543 | −0.573822 | −14.268316 | 0.045682 |
| 245.299562 | −0.170266 | −13.86487 | 0.022131 |
| 324.077238 | 6.378783 | −18.21167 | −0.373971 |
| 16.418899 | 2.17435 | −0.339616 | −0.117021 |
| 263.093464 | −2.132793 | −14.645109 | 0.111404 |
| 263.093464 | −2.132793 | −14.645109 | 0.111404 |
| 263.093464 | −2.132793 | −14.645109 | 0.111404 |

TABLE 1-continued

| Constants | | | |
|---|---|---|---|
| 263.093464 | −2.132793 | −14.645109 | 0.111404 |
| 196.811136 | 4.33716 | −10.977676 | −0.252197 |
| 196.811136 | 4.337165 | −10.977676 | −0.252197 |
| 196.811136 | 4.337165 | −10.977676 | −0.252197 |
| 196.811136 | 4.337165 | −10.977676 | −0.252197 |
| −238.929963 | 4.927783 | 14.139828 | −0.282557 |
| −238.929963 | 4.927783 | 14.139828 | −0.282557 |
| −238.929963 | 4.927783 | 14.139828 | −0.282557 |
| −238.929963 | 4.927783 | 14.139828 | −0.282557 |
| −290.816544 | −0.435913 | 16.614043 | 0.03005 |

Table 1 is also available in the Federal Highway Administration (FHWA) Traffic Noise Model (FHWA TNM) Technical Manual published by the U.S. Department of Transportation in February 1998 as Table 5.

In some implementations, calculating the predicted noise level for the respective location may include calculating an A-weighted equivalent sound level (LAeq). A-weighted equivalent sound level may include a measure of noise exposure that accounts for both the intensity and duration of sound. A-weighted equivalent sound level can represent the constant sound level that would contain the same amount of sound energy as the fluctuating noise levels experienced over a specific period. A-weighting may be applied to the measurement to mimic the human ear's sensitivity to different frequencies. In some implementations, A-weighted equivalent sound level may be more representative indicator of perceived loudness.

At block 230, processing logic may cause the user device 110 to display a map. In some implementations, the traffic noise prediction subsystem 114 may provide the predicted noise level for each location of the one or more locations to the traffic noise system 112. The traffic noise system 112 may use the predicted noise levels to generate a UI. The UI may include a UI presented on the user device 110. The UI may include a UI of the traffic noise system 112 or the application 118. The UI may include a map. The map may include, for each location of the one or more locations, a visual indication of the predicted noise level for the respective location. The visual indication may include an image, icon, color, or pattern corresponding to a noise level or a range of noise levels. The visual indication may help a user of the user device 110 to quickly determine the noise level for the location indicated by the visual indication.

In some implementations, the data for the location-specific traffic data, the vehicle count model 308, and the vehicle class mix model 408 may be of a data size such that the location-specific traffic data, the vehicle count model 308, and the vehicle class mix model 408 can be stored on the user device 110. In some implementations, the location-specific traffic data, the vehicle count model 308, and the vehicle class mix model 408 may be 700 megabytes or fewer. The processing device usage and memory usage needed to execute the vehicle count model 308 and the vehicle class mix model 408 may also be sufficiently small as to be executable on the user device 110.

Figure 5:
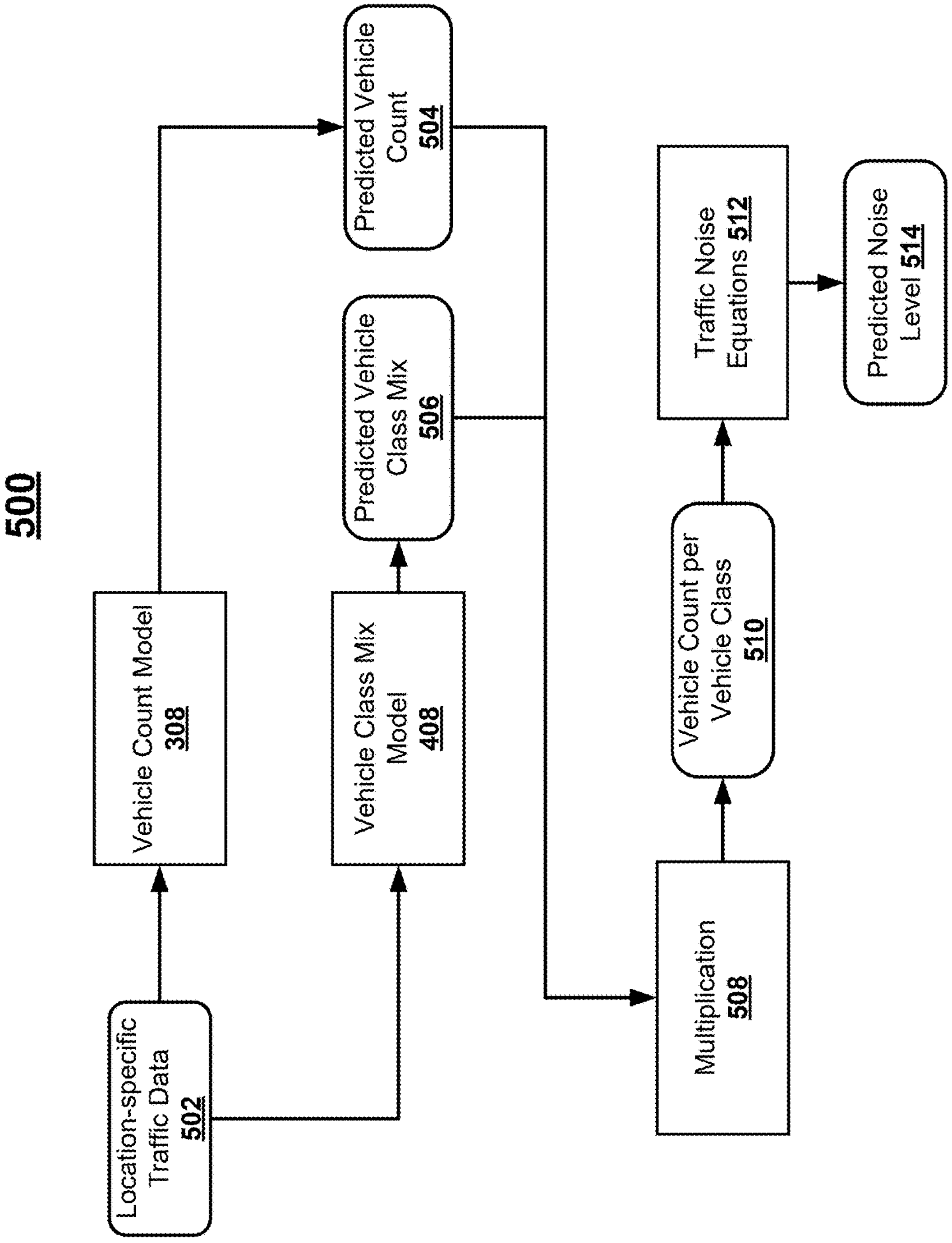

FIG. 5 schematically illustrates an example data flow 500 for fine-grained traffic noise prediction, in accordance with some implementations of the present disclosure. The data flow 500 may include a flow of data during an execution of the block 220 of the method 200 of FIG. 2. In one implementation, the data flow 500 may occur at the traffic noise prediction subsystem 114.

In one implementation, the data flow 500 may include using location-specific traffic data 502 for a respective location as input to the vehicle count model 308. The vehicle count model 308 may predict, using the location-specific traffic data 502 as input, the predicted vehicle count 504, e.g., as discussed above in relation to block 222. The data flow 500 may include using the location-specific traffic data 502 as input to the vehicle class mix model 408. The vehicle class mix model 408 may predict, using the location-specific traffic data 502 as input, the predicted vehicle class mix 506, e.g., as discussed above in relation to block 224.

In some implementations, the data flow 500 includes multiplying 508 the predicted vehicle count 504 and the predicted vehicle class mix 506 to calculate the vehicle count per vehicle class 510, e.g., as discussed above in relation to block 226. The data flow 500 may include using the vehicle count per vehicle class 510 with the traffic noise equations 512, to calculate the predicted noise level for the respective location, e.g., as discussed above in relation to block 228. The data flow 500 may repeat for each location of the one or more locations obtained in block 210, using the location-specific traffic data 502 associated with the respective location.

Figure 6:
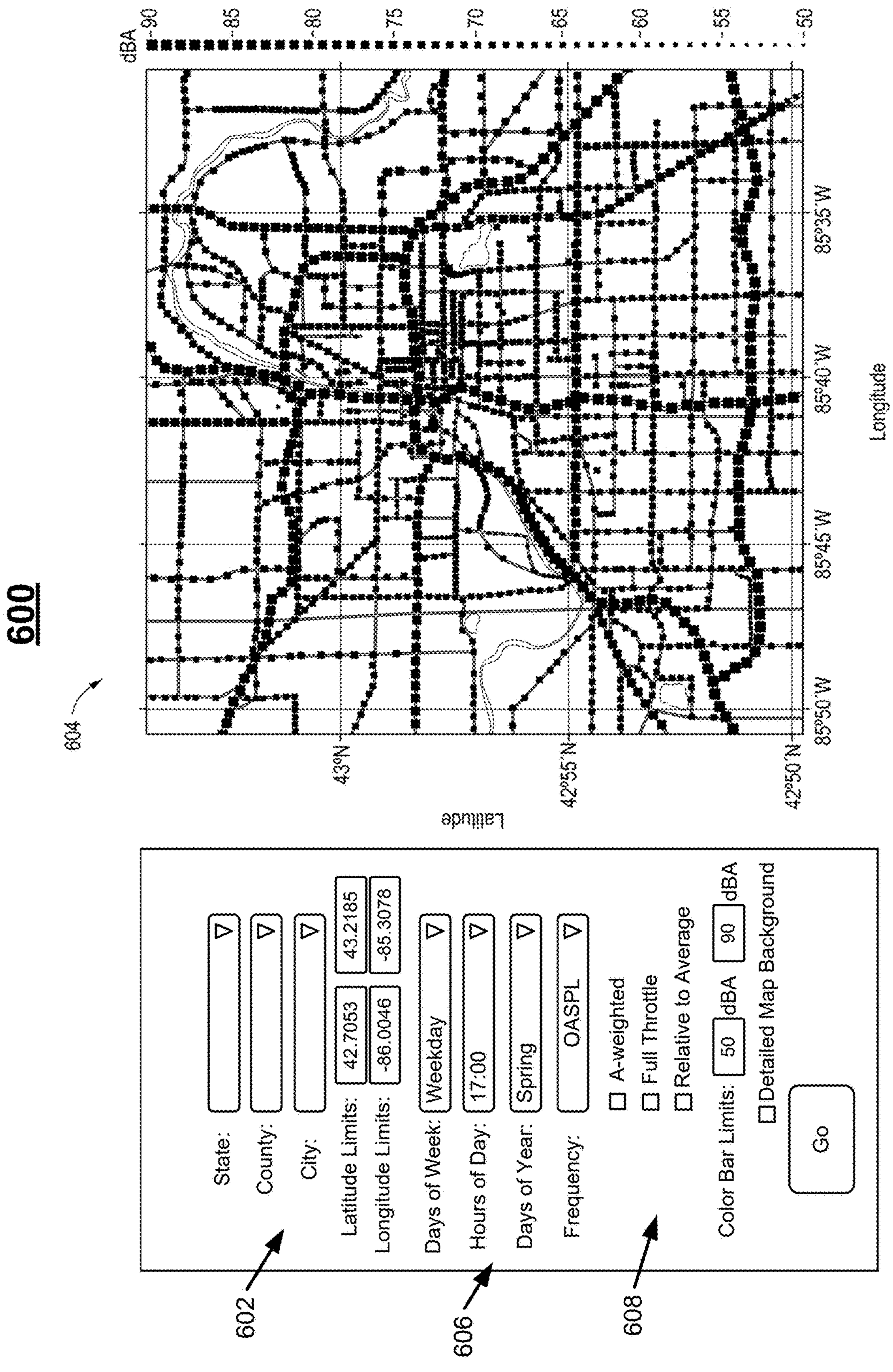
FIG. 6 depicts an example user interface (UI) for fine-grained traffic noise prediction, in accordance with some implementations of the present disclosure.

FIG. 6 depicts an example UI 600 for fine-grained traffic noise prediction, in accordance with some implementations of the present disclosure. In one implementation, the UI 600 may include a location input element 602. The location input element 602 may include one or more UI elements where a user of the UI 600 can specify one or more locations. For example, as seen in FIG. 6, the location input element 602 may include one or more drop-down boxes where the user can specify geographic locations (e.g., a country, a state/province, a county, a city, or some other geographic location or political subdivision). The location input element 602 may include one or more text boxes where the user can specify geographic coordinates (e.g., a range of latitude and longitude values). In one implementation, the UI 600 may include a map UI element 604. The map UI element 604 may be configured to allow a user to scroll around a map, zoom in or out of the map, or other similar functionality in order to select an area of the map to use as the one or more locations.

The UI 600 may include a time input element 606. The time input element 606 may include one or more UI elements where a user of the UI 600 can specify a time period for the predicted noise level 514. For example, as seen in FIG. 6, the time input element 606 may include UI elements where a user can a day of the week (e.g., a calendar weekday, a weekday in general, a weekend, etc.), an hour or range of hours during the day, a specific month, a season of the year (e.g., spring, summer, fall, winter, etc.), or other time data. The UI 600 may include other UI elements 608 used to customize the predicted noise level 514 (e.g., a drop-down box for selecting the type of frequency of the predicted noise level 514, a checkbox to select that the predicted noise level 514 is A-weighted, or text boxes to input color bar limits). In some implementations, the map UI element 604 may include, for each location of the one or more locations, a visual indication of the predicted noise level 514 for the respective location. For example, as seen in FIG. 6, different predicted noise levels 514 for different locations are represented by different sized boxes. A visual indication that indicates the predicted noise level 514 for a location may include a color, an icon, or other visual indications capable of indicating different predicted noise levels 514.

Figure 7:
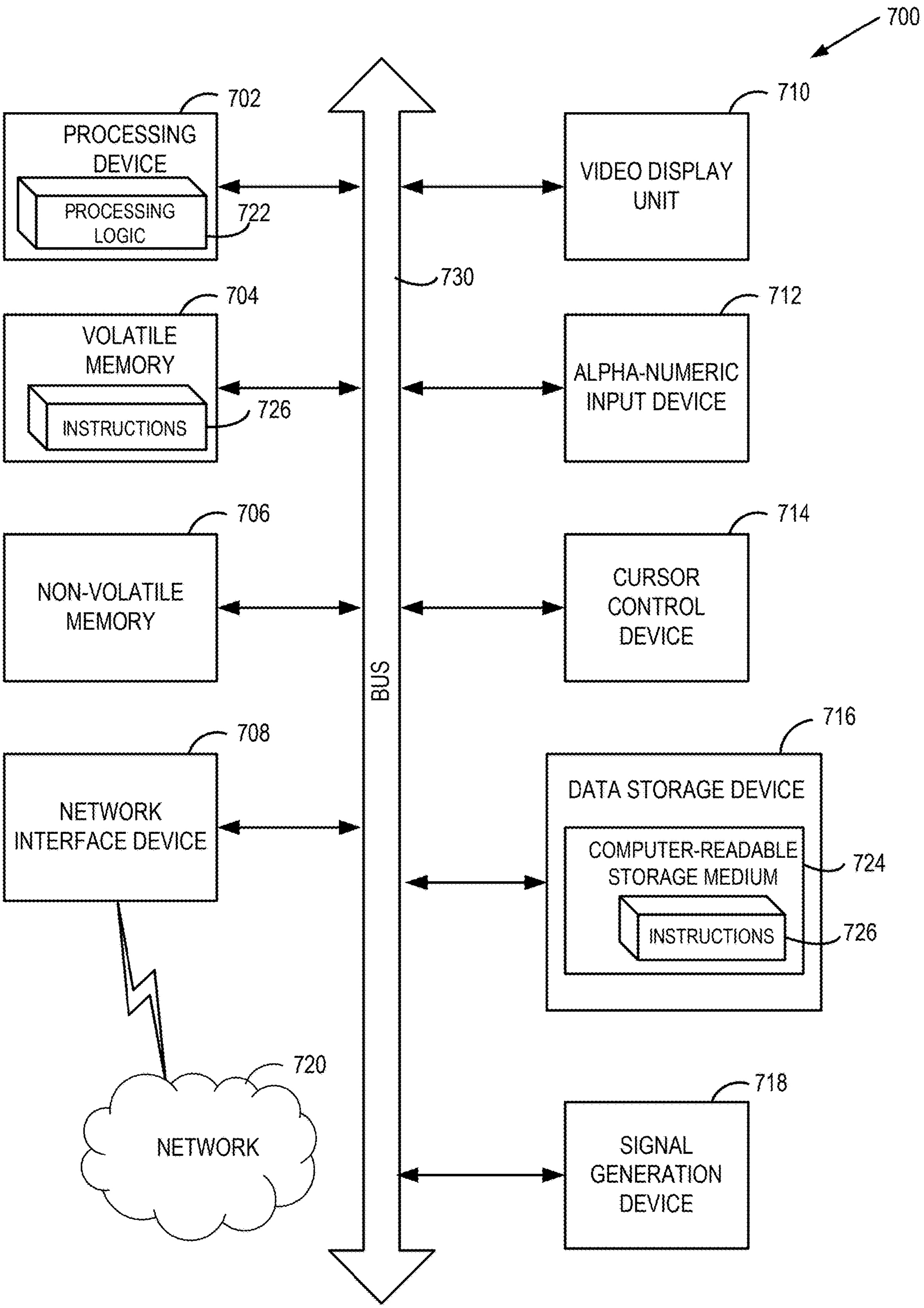
FIG. 7 depicts a block diagram of an example computer device capable of fine-grained traffic noise prediction, in accordance with some implementations of the present disclosure.

FIG. 7 is a block diagram illustrating an example computer system 700, in accordance with implementations of the present disclosure. The computer system can be a computing device or other device discussed herein. The computer system 700 can be the user device 110 of FIG. 1A or FIG. 1B, or the computer system 700 can be the traffic noise server 140 of FIG. 1B. The computer system 700 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a volatile memory 704 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 706 (e.g., flash memory, static random access memory (SRAM), etc.), and a data storage device 716, which communicate with each other via a bus 730.

The processing device 702 represents one or more general-purpose processing devices such as a microprocessor, CPU, GPU, or the like. More particularly, the processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an ASIC, a field programmable gate array (FPGA), a digital signal processor (DSP), network processor, or the like. The processing device 702 is configured to execute instructions 726 (e.g., for performing one or more of the method 200 or portions of the data flows 300, 400, or 500) for performing the operations discussed herein.

The computer system 700 can further include a network interface device 708. The network interface device 708 can assist in data communication between computing devices. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a non-transitory machine-readable storage medium 724 (also computer-readable storage medium) on which is stored one or more sets of instructions 726. The instructions may embody any one or more of the methodologies or functions described herein. The instructions 726 can also reside, completely or at least partially, within the volatile memory 704 and/or within the processing device 702 during execution thereof by the computer system 700, the volatile memory 704 and the processing device 702 also constituting machine-readable storage media. The instructions 726 can further be transmitted or received over a network 720 via the network interface device 708.

In one implementation, the instructions 726 include instructions for fine-grained traffic noise prediction. While the computer-readable storage medium 724 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the method 200 is depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interactions between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

obtaining location data indicating one or more locations and, for each respective location of the one or more locations, location-specific traffic data;

for each respective location of the one or more locations:

predicting, using a vehicle count model and using the location-specific traffic data for the respective location as input to the vehicle count model, a vehicle count for the respective location, predicting, using a vehicle class mix model and using the location-specific traffic data for the respective location as input to the vehicle class mix model, a vehicle class mix for the respective location, calculating, based on the predicted vehicle count and the predicted vehicle class mix, a number of vehicles per vehicle class for the respective location, and calculating, based on the number of vehicles per vehicle class, a predicted noise level for the respective location; and causing a client device to display a map, wherein the map comprises, for each location of the one or more locations, a visual indication of the predicted noise level for the respective location.

2. The method of claim 1, wherein the location-specific traffic data for the respective location comprise one or more of:

data indicating whether the respective location is urban or rural;

data indicating a road classification of the respective location;

data indicating a number of through lanes at the respective location;

data indicating a speed limit for the respective location; or data indicating an annual average daily traffic amount of the respective location.

3. The method of claim 1, wherein the predicted vehicle count for the respective location comprises a periodic vehicle count over a time period.

4. The method of claim 3, wherein:

the periodic vehicle count comprises an hourly vehicle count; and the time period comprises one week.

5. The method of claim 1, wherein the predicted vehicle class mix for the respective location comprises a periodic vehicle class mix over a time period.

6. The method of claim 5, wherein:

the periodic vehicle class mix comprises an hourly vehicle class mix; and the time period comprises one week.

7. The method of claim 1, wherein calculating, based on the number of vehicles per vehicle class, the predicted noise level for the respective location comprises selecting and using constants based on vehicle type and pavement type.

8. The method of claim 1, further comprising:

obtaining vehicle count data generated by a traffic monitoring station;

performing a Fourier analysis on the vehicle count data to generate one or more vehicle count coefficients; and using the one or more vehicle count coefficients to generate the vehicle count model.

9. The method of claim 1, further comprising:

obtaining vehicle class mix data;

generating, based on the vehicle class mix data, one or more vehicle class mix coefficients; and using the one or more vehicle class mix coefficients to generate the vehicle class mix model.

10. The method of claim 8, wherein the one or more vehicle class mix coefficients comprise, for each vehicle class of the vehicle class mix data:

one or more vehicle class mix coefficients representing a relative amount of vehicles of the respective vehicle class over a first time period; and one or more vehicle class mix coefficients representing the relative amount of vehicles of the respective vehicle class over a second time period, wherein the first time period is longer than the second time period.

11. A system, comprising:

a memory; and a processing device, coupled to the memory, configured to perform operations, comprising:

obtaining location data indicating one or more locations and, for each respective location of the one or more locations, location-specific traffic data, for each respective location of the one or more locations:

predicting, using a vehicle count model and using the location-specific traffic data for the respective location as input to the vehicle count model, a vehicle count for the respective location, predicting, using a vehicle class mix model and using the location-specific traffic data for the respective location as input to the vehicle class mix model, a vehicle class mix for the respective location, calculating, based on the predicted vehicle count and the predicted vehicle class mix, a number of vehicles per vehicle class for the respective location, and calculating, based on the number of vehicles per vehicle class, a predicted noise level for the respective location, and causing a client device to display a map, wherein the map comprises, for each location of the one or more locations, a visual indication of the predicted noise level for the respective location.

12. The system of claim 11, wherein the client device comprises the memory and the processing device.

13. The system of claim 11, further comprising a server that comprises the memory and the processing device, wherein the server is in data communication with the client device over a network.

14. The system of claim 11, wherein calculating the predicted noise level for the respective location comprises calculating an A-weighted equivalent sound level.

15. The system of claim 11, wherein:

obtaining the location-specific traffic data for a respective location of the one or more locations comprises obtaining data indicating a speed limit for the respective location and a pavement type for the respective location; and calculating the predicted noise level for the respective location is further based on the data indicating the speed limit and the pavement type.

16. A non-transitory computer-readable storage medium with instructions that, when executed by a processing device, cause the processing device to perform operations, comprising:

obtaining location data indicating one or more locations and, for each respective location of the one or more locations, location-specific traffic data;

for each respective location of the one or more locations:

predicting, using a vehicle count model and using the location-specific traffic data for the respective location as input to the vehicle count model, a vehicle count for the respective location, predicting, using a vehicle class mix model and using the location-specific traffic data for the respective location as input to the vehicle class mix model, a vehicle class mix for the respective location, calculating, based on the predicted vehicle count and the predicted vehicle class mix, a number of vehicles per vehicle class for the respective location, and calculating, based on the number of vehicles per vehicle class, a predicted noise level for the respective location; and causing a client device to display a map, wherein the map comprises, for each location of the one or more locations, a visual indication of the predicted noise level for the respective location.

17. The computer-readable storage medium of claim 16, wherein the location-specific traffic data for the respective location comprise one or more of:

data indicating whether the respective location is urban or rural;

data indicating a road classification of the respective location;

data indicating a number of through lanes at the respective location;

data indicating a speed limit for the respective location; or data indicating an annual average daily traffic amount of the respective location.

18. The computer-readable storage medium of claim 16, further comprising:

obtaining vehicle class mix data;

generating, based on the vehicle class mix data, one or more vehicle class mix coefficients; and using the one or more vehicle class mix coefficients to generate the vehicle class mix model.

19. The computer-readable storage medium of claim 18, wherein the one or more vehicle class mix coefficients comprise, for each vehicle class of the vehicle class mix data:

one or more vehicle class mix coefficients representing a relative amount of vehicles of the respective vehicle class over a first time period; and one or more vehicle class mix coefficients representing the relative amount of vehicles of the respective vehicle class over a second time period, wherein the first time period is longer than the second time period.

20. The computer-readable storage medium of claim 16, wherein:

the predicted vehicle count for the respective location comprises a periodic vehicle count over a time period;

the periodic vehicle count comprises an hourly vehicle count; and the time period comprises one week.

* * * * *